United States Patent
Bewer et al.

(10) Patent No.: US 9,325,139 B2
(45) Date of Patent: Apr. 26, 2016

(54) COOLING LASER GAS

(71) Applicant: TRUMPF Laser- und Systemtechnik GmbH, Ditzingen (DE)

(72) Inventors: Thomas Bewer, Richterswil (CH); Jochen Doberitzsch, Gerlingen (DE); Andreas Lehr, Edlibach (CH); Manuel Tiefenthaler, Lucerne (CH)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 14/511,327

(22) Filed: Oct. 10, 2014

(65) Prior Publication Data
US 2015/0030043 A1    Jan. 29, 2015

Related U.S. Application Data

(63) Continuation of application No. PCT/EP2013/056227, filed on Mar. 25, 2013.

(30) Foreign Application Priority Data

Apr. 11, 2012  (DE) .......................... 10 2012 205 870

(51) Int. Cl.
*H01S 3/04*      (2006.01)
*H01S 3/041*     (2006.01)
(Continued)

(52) U.S. Cl.
CPC .............. *H01S 3/0407* (2013.01); *H01S 3/036* (2013.01); *H01S 3/041* (2013.01); *H01S 3/076* (2013.01); *H01S 3/2232* (2013.01)

(58) Field of Classification Search
CPC ........ H01S 3/036; H01S 3/041; H01S 3/0407
See application file for complete search history.

(56) References Cited

U.S. PATENT DOCUMENTS 5,426,659 A *    6/1995  Sugiyama ............... H01S 3/036
                                                  372/34
2003/0179797 A1* 9/2003  Egawa ...................... H01S 3/03
                                                  372/58

(Continued)

FOREIGN PATENT DOCUMENTS

DE     102008013816 B4    9/2010
DE     102010030141 A1   12/2011

(Continued)

OTHER PUBLICATIONS

Notification of Transmittal of Translation of the International Preliminary Report on Patentability and Written Opinion of the International Searching Authority from corresponding PCT Application No. PCT/EP2013/056227, mailed Oct. 23, 2014, 19 pages.

(Continued)

*Primary Examiner* — Yuanda Zhang
*Assistant Examiner* — Michael Carter
(74) *Attorney, Agent, or Firm* — Fish & Richardson P.C.

(57) ABSTRACT

A cooling arrangement for cooling laser gas for a gas laser includes a first cooling circuit having a first cooling assembly and a first heat exchanger for cooling laser gas which flows from a fan to a resonator of the gas laser, and a second cooling circuit which is independent of the first and which has a second cooling assembly and a second heat exchanger for cooling laser gas which flows from the resonator to the fan. The second cooling circuit has at least one additional heat exchanger for additionally cooling the laser gas which flows from the fan to the resonator.

12 Claims, 2 Drawing Sheets

(51) Int. Cl.
*H01S 3/223* (2006.01)
*H01S 3/036* (2006.01)
*H01S 3/07* (2006.01)

(56) References Cited

U.S. PATENT DOCUMENTS

| | | | |
|---|---|---|---|
| 2004/0125850 A1* | 7/2004 | Hayashikawa | H01S 3/041 |
| | | | 372/85 |
| 2004/0221604 A1* | 11/2004 | Ota | H05K 7/20781 |
| | | | 62/259.2 |
| 2011/0024401 A1* | 2/2011 | Wahl | B23K 26/14 |
| | | | 219/121.62 |
| 2011/0243177 A1 | 10/2011 | Nishio et al. | |
| 2012/0087092 A1* | 4/2012 | Huber | F28D 15/00 |
| | | | 361/701 |
| 2013/0100975 A1 | 4/2013 | Borstel | |

FOREIGN PATENT DOCUMENTS

| | | |
|---|---|---|
| JP | 01232779 A | 9/1989 |
| JP | 0453281 A | 2/1992 |

OTHER PUBLICATIONS

International Search Report from corresponding PCT Application No. PCT/EP2013/056227, mailed Jun. 24, 2013, 6 pages.

\* cited by examiner

COOLING LASER GAS

CROSS REFERENCE TO RELATED APPLICATIONS

This application is a continuation of and claims priority under 35 U.S.C. §120 to PCT Application No. PCT/EP2013/056227 filed on Mar. 25, 2013, which claimed priority to German Application No. 10 2012 205 870.2, filed on Apr. 11, 2012. The contents of both of these priority applications are hereby incorporated by reference in their entirety.

TECHNICAL FIELD

The present invention relates to cooling laser gas in a gas laser having a fan that motivates a laser gas flow to a resonator of the gas laser.

BACKGROUND

Gas lasers, in particular $CO_2$ lasers, generally have a folded laser resonator in which the laser beam is folded in one or more parallel planes which are located one above the other, for which there are arranged in each plane mirror elements which are conventionally accommodated in a plurality of corner housings. Discharge pipes having electrodes for exciting the laser gas are arranged between the corner housings. The laser gas is supplied by a fan as a pressure source which may be constructed, for example, as a radial fan, to the corner housings by means of supply lines. A heat exchanger of a first cooling circuit is generally arranged in this instance in a respective supply line or a supply housing in order to cool the laser gas before entry into the corner housing and consequently into the beam guiding space. The laser gas circuit of the gas laser is closed by means of suction lines or suction housings, via which the heated laser gas is drawn from the discharge pipes and supplied to the (radial) fan. In such a suction line, a heat exchanger of a second cooling circuit which is typically independent of the first (that is to say, which is provided with a separate cooling medium flow) may also be provided in order to cool the laser gas before supply to the radial fan.

DE 10 2008 013 816 B4 discloses a method and a device for recovering energy from a laser processing system in which a gas laser can be used, for example, as a laser source. When the laser processing system is operated, thermal energy is produced with a maximum temperature $T_{MAX}$. This thermal energy is removed from the laser processing system up to a limit temperature $T_Z < T_{MAX}$ and made available to an energy recovery device. The limit temperature $T_Z$ in this instance forms the temperature threshold from which the energy recovery device can be used.

In one embodiment of DE 10 2008 013 816 B4, the laser processing system has a gas laser which is constructed as described above and in which heat exchangers are provided in the suction housings or in the supply housings. In order to be able to operate the energy recovery system with the highest possible limit temperature $T_Z$, the highest possible cooling medium discharge temperature is sought, which is intended to be obtained by means of the greatest possible difference between a laser gas temperature before flowing through a heat exchanger and the laser gas temperature after flowing through the heat exchanger. The heat exchanger or the cooling ribs of the heat exchanger are preferably intended to be provided either in the discharge housing or in the supply housing in order to prevent gradual cooling of the laser gas.

An object of the present invention is to develop a cooling arrangement for a gas laser, a gas laser and a method of the type discussed above, having beneficial thermal efficiency.

SUMMARY

According to one aspect of the invention, a multi-stage cooling action via separate cooling circuits is provided in place of a single-stage cooling action for the laser gas flowing from the fan to the resonator. Owing to such a multi-stage cooling action, it is possible for the thermal energy absorbed by the second cooling circuit to be discharged at a higher temperature level so that—as long as the heat is not used—it can be discharged directly to the environment with less energy expenditure. Even when the thermal energy is intended to be used and, for example, supplied to an energy recovery unit, the discharge at a higher temperature level is advantageous since, as described above, an energy recovery unit can be operated only from a predetermined limit temperature $T_Z$. In addition, most energy recovery units have a higher degree of efficiency at a higher temperature. A multi-stage cooling of the laser gas which is supplied from the fan to the resonator is advantageous in this instance since the laser gas flowing into the resonator is generally not intended to exceed a specific temperature which may be, for example, approximately 50° C.

Optionally, the first cooling circuit may also have at least one additional heat exchanger for additionally cooling the laser gas flowing from the resonator to the fan. This is particularly advantageous when a waste heat utilization system having an energy recovery unit is used, which requires or can use the different temperature levels, for example, with multi-stage absorption refrigeration units.

In one embodiment, during operation of the cooling arrangement a minimum cooling medium temperature of the first cooling circuit is lower than a minimum cooling medium temperature of the second cooling circuit. To this end, the cooling capacity of the cooling assemblies is selected in such a manner, or the cooling medium mass flow is adjusted in such a manner, that the temperature of the cooling medium, which is discharged from the cooling assembly of the second cooling circuit, is higher than the temperature of the cooling medium which is provided by the first cooling assembly. The difference between the two minimum cooling medium temperatures may be more than 10 K, more than 15 K or even more than 20 K. In this manner, regardless of the temperature of the laser gas, it can be ensured that the thermal energy of the second cooling circuit is discharged at a sufficiently high temperature level.

In another embodiment, the second cooling circuit is constructed to flow through the second heat exchanger and the additional heat exchanger with a cooling medium in a parallel manner. To this end, the cooling medium flow is typically guided from the second cooling assembly via a common cooling medium line to a branching location at which the cooling medium flow is divided into two part-flows, which are respectively supplied to the second heat exchanger and the additional heat exchanger and which, after flowing through the heat exchangers, are combined again at an additional branching location and returned via a common cooling medium line to the second cooling assembly. The division of the cooling medium flow at the branching location can be carried out in a symmetrical manner, that is to say, one half of the cooling medium mass flow is used to cool the laser gas flowing from the fan to the resonator, the other half to cool the laser gas flowing from the resonator to the fan. However, it is self-evident that an asymmetrical division of the cooling medium mass flow can also be carried out, for example, at a ratio of 40:60.

In another embodiment, during operation of the cooling arrangement a cooling medium mass flow through the additional heat exchanger is smaller than a cooling medium mass flow through the first heat exchanger. This is advantageous since a smaller cooling medium mass flow through the additional heat exchanger leads to the cooling medium remaining in the heat exchanger for a longer period of time and therefore leads to greater heating of the cooling medium of the second cooling circuit.

In another embodiment, the cooling arrangement has an adjustment device for adjusting a cooling medium mass flow through the second cooling circuit. The adjustment device may be, for example, a pump or the like. It is advantageous in this instance for the cooling medium mass flow through the second cooling circuit and the cooling capacity of the second cooling assembly to be adjustable independently of each other. In particular, the use of an adjustment device is advantageous when the second cooling assembly itself does not enable any adjustment of the cooling capacity, for example, when the second cooling assembly is a passive cooling assembly, for example, in the form of an open air cooler. In this instance, the adjustment of the cooling medium mass flow enables the regulation of the temperature level at which thermal energy is discharged from the second cooling assembly or a device connected thereto. The adjustment of the cooling medium mass flow of the second cooling medium circuit also enables the discharged thermal energy to be provided to an energy recovery system at a defined adjustable temperature above the limit temperature $T_Z$.

The first cooling assembly may, for example, be a compression cooling assembly which enables adjustment of the cooling capacity. Such cooling assemblies are conventional for cooling gas laser systems. Typically, a plurality of such cooling assemblies are accommodated in a common housing. In this instance, one or more of the cooling assemblies can be used to cool the laser gas. Additional compression cooling assemblies provided in the housing can be used, for example, to cool the HF generator or the frame and the optical units of the gas laser or a laser processing system which uses the gas laser as a beam source. The cooling assemblies accommodated in the housing may optionally be coupled to each other by means of heat exchangers so that the compression optionally has to be carried out only once for all the cooling assemblies accommodated in the housing. Owing to the additional cooling of the laser gas using the second cooling circuit, the compression cooling assembly can be reduced in terms of its cooling capacity and can therefore have smaller dimensions than is usual with conventional cooling systems.

In another embodiment, the second cooling assembly is an open air cooler, that is to say, a passive cooler. Via such an open air cooler, the thermal energy from the second cooling circuit can be directly discharged to the environment. In this instance, use can be made of the fact that the temperature level at which the thermal energy is discharged is generally substantially above the ambient temperature so that the heat can be discharged to the ambient air with little energy expenditure.

In another embodiment, at least one of the heat exchangers is a plate type heat exchanger, finned cooler, coil cooler or waste gas heat exchanger. It is generally advantageous for certain applications that the heat exchangers enable a modular construction, particularly when at least two heat exchangers are intended to be accommodated in a common supply housing or a common suction housing. In a plate type heat exchanger, the laser gas flows over a plurality of generally parallel plates, through the intermediate spaces of which laser gas or a cooling medium alternately flow. In the finned cooler, the surface available for cooling is increased by the provision of fins on a respective cooling element through which cooling medium flows (for example, a pipe). In the coiled cooler, the tubular cooling channel is constructed in a coiled or helical manner and may, for example, be produced from a metal material, for example, from aluminum. Waste gas heat exchangers in which the heat exchange fluid flows, for example, through a rectangular pipe provided with special structures, can also be used for this purpose. In particular with finned coolers in which the fins or ribbed pipes extend transversely relative to the flow direction of the laser gas and are integrated in a heat exchanger cartridge, individual cooling circuits can be separated in a particularly simple manner.

Another aspect of the invention relates to a gas laser comprising: a laser resonator, a fan for producing a gas flow of a laser gas, and a cooling arrangement for cooling the laser gas which flows from the fan to the resonator and from the resonator to the fan. The gas laser which is provided with the cooling arrangement described above—in particular when the entry temperature of the laser gas is lower than with existing systems—can be operated with an increased level of thermal efficiency.

In some embodiments, the gas laser further comprises an energy recovery unit for recovering thermal energy during operation of the gas laser at the second cooling assembly. Using the cooling arrangement, the temperature level at which the thermal energy is provided can be adapted to the requirements of the energy recovery unit; that is to say, the heat can be provided at an adjustable temperature between a maximum temperature of the laser gas or the cooling medium and the limit temperature of the energy recovery system.

The invention also relates to a method for cooling laser gas for a gas laser, in which cooling of the laser gas, which flows from the fan to the resonator, is further carried out by means of an additional heat exchanger of the second cooling circuit. In the method according to the invention, a multi-stage cooling process of the laser gas using two different cooling circuits is carried out in order to increase the efficiency level of the gas laser or the entire laser system.

Other advantages of the invention will be appreciated from the description and the drawings. The features mentioned above and those set out below may also be used individually per se or together in any combination. The embodiments shown and described are not intended to be understood to be a conclusive listing but are instead of exemplary character for describing the invention.

DETAILED DESCRIPTION

Figure 1:
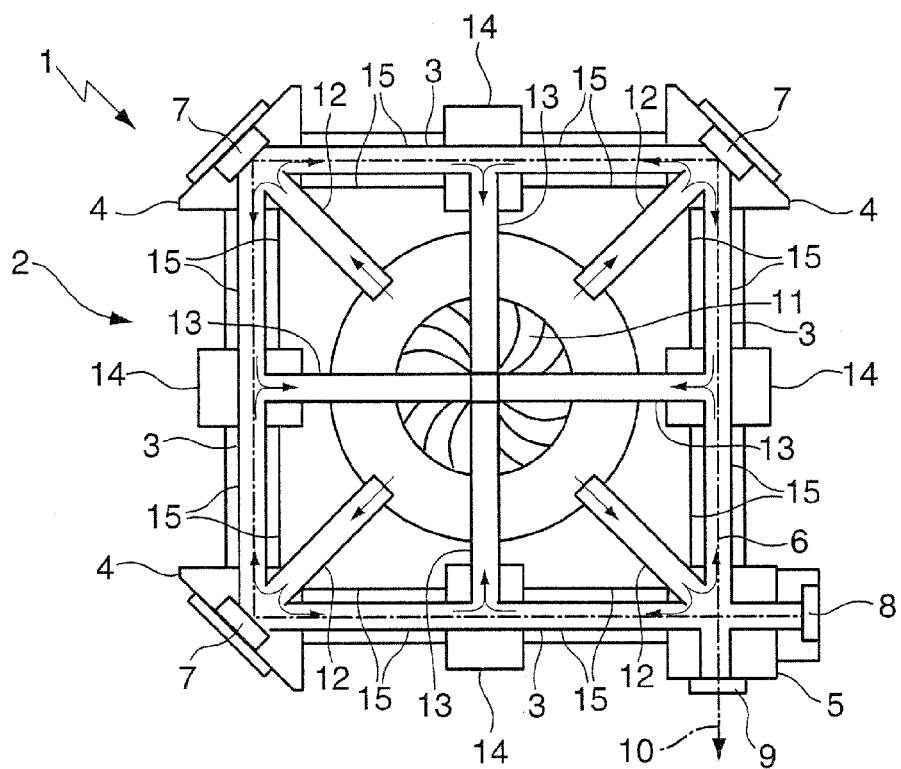
FIG. 1 is a sectioned plan view of a $CO_2$ gas laser with a folded laser resonator.
Figure 2:
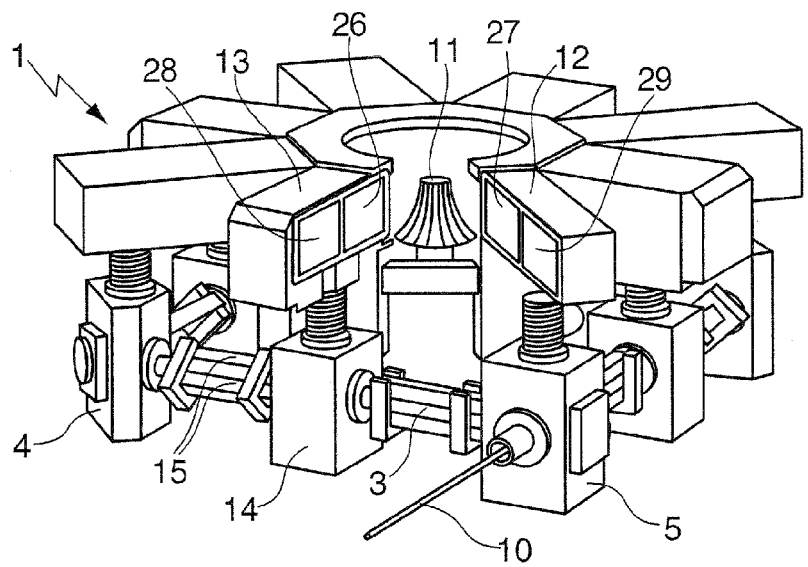
FIG. 2 is a perspective illustration of the $CO_2$ gas laser from FIG. 1.

The $CO_2$ gas laser 1 shown in FIG. 1 and FIG. 2 has a laser resonator 2 which is folded in a square manner and which has four mutually adjacent laser discharge pipes 3 connected to each other by corner housings 4, 5. A laser beam 6 which extends in the direction of the axes of the laser discharge pipes 3 is illustrated with dot-dash lines. Redirection mirrors 7 in the corner housings 4 serve to redirect the laser beam 6 through 90° in each case. In one of the corner housings 5, a rear mirror 8 and a partially transmissive decoupling mirror 9 are arranged. The rear mirror 8 is constructed so as to be highly reflective and reflects the laser beam 6 through 180° so that the laser discharge pipes 3 are passed through once more in the opposite direction. While a portion of the laser beam 6 is decoupled from the laser resonator 2 at the partially transmissive decoupling mirror 9, the other portion remains in the laser resonator 2 and passes through the laser discharge pipes 3 again. The laser beam which is decoupled from the laser resonator 2 via the decoupling mirror 9 is designated 10 in FIG. 1.

In the center of the folded laser resonator 2 there is arranged as a pressure source for laser gas a radial fan 11 connected to the corner housings 4, 5 by laser gas supply housings 12. Centrally between the corner housings 4, 5, are other housings 14 of the laser resonator 2 which are connected to suction housings 13 that serve to draw the laser gas from the laser resonator 2 and to return it to the radial fan 11. The flow direction of the laser gas inside the laser discharge pipes 3 and in the supply and suction housings 12, 13 is indicated in FIG. 1 with arrows. The excitement of the laser gas is carried out by electrodes 15 arranged adjacent to the laser discharge pipes 3 and which are connected to an HF generator (not illustrated). It is possible to use, for example, a tubular generator with an excitation frequency of 13.56 MHz or 27.12 MHz, as an HF generator.

As can be seen in FIG. 2, both in a respective supply housing 12 and in a respective suction housing 13 of the gas laser 1, two heat exchangers 26, 27, 28, 29 are also introduced in each case in order to enable gradual cooling of the laser gas. The gas laser 1 shown in FIG. 2 is cooled for this gradual cooling with a cooling arrangement 16 shown in FIG. 5, which differs from a conventional cooling arrangement 16 which is described below in connection with FIG. 3.

Figure 3:
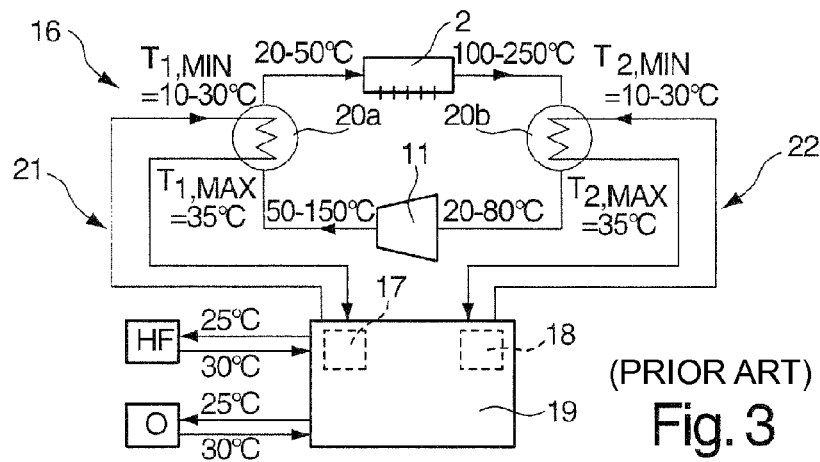
FIG. 3 is a schematic illustration of a cooling arrangement for the gas laser of FIG. 1 and FIG. 2 with a first and a second cooling circuit.

The conventional cooling arrangement 16 for a gas laser shown in FIG. 3 has a first and second cooling circuit 21, 22. The first cooling circuit 21 serves to cool laser gas which flows from the fan 11 to the resonator 2, while the second cooling circuit 22 serves to cool laser gas flowing in the opposite direction, that is to say, from the resonator 2 to the fan 11.

When the gas laser is operated, in a respective cooling circuit 21, 22 a cooling medium, generally a cooling fluid, in particular cooling water, is cooled by a respective compression cooling assembly 17, 18 to a temperature $T_{1,MIN}$ or $T_{2,MIN}$ of between approximately 10° C. and approximately 30° C. The cooling medium flowing out of the first compression cooling assembly 17 is subsequently divided at a branching location (not shown) between the supply housings 12 (not shown in FIG. 3) and passes through a respective first heat exchanger 20*a* in a plurality of parallel part-flows. Accordingly, the cooling medium provided by the second compression assembly 18 is divided at a branching location (also not shown) between the suction housings 13 and passes through the second heat exchangers 20*b* arranged at that location in several parallel part-flows. The cooling capacity of a respective cooling assembly 17, 18 is in this instance adjusted by a control or regulation device (not shown) in such a manner that the temperature of the cooling medium returned to the respective cooling assembly 17, 18 is at a temperature $T_{1,MAX}$ or $T_{2,MAX}$ of between approximately 30° C. and approximately 40° C.

Via the first cooling circuit 21, laser gas that is discharged by the fan 11 at a temperature of approximately 50° C.-150° C. is cooled, before flowing into the resonator 2, to a temperature of between approximately 20° C. and 50° C. This is generally necessary since the laser gas enters via the corner housings 4, 5 the laser discharge pipes 3 (cf. FIG. 2) in which the respective redirection, return and decoupling mirrors 7, 8, 9 of the resonator 2 are also located. The laser gas is heated in the resonator 2 to temperatures of typically approximately 100° C. to 250° C. Using the second cooling circuit 22 or the second heat exchanger 20*b*, the laser gas flowing back to the radial fan 11 is cooled to temperatures of approximately from 20° C. to approximately 80° C. The radial fan 11 compresses the laser gas and heats it to temperatures of approximately 50-150° C.

In the cooling arrangement 16 shown in FIG. 3, the temperatures of the cooling medium in the first and second cooling circuit 21, 22 are substantially of the same size and are produced using compression cooling assemblies 17, 18 which are independent or optionally coupled via a heat exchanger. The two compression cooling assemblies 17, 18 are accommodated with additional compression cooling assemblies (not shown) in a common housing 19. The additional compression cooling assemblies serve to cool the high-frequency generator which is designated HF in FIG. 3, and the optical components of the gas laser 1 which are designated O in FIG. 3.

In the cooling arrangement 16 of FIG. 3, the cooling medium in the cooling circuits 21, 22 reaches a maximum temperature $T_{1,MAX}$ or $T_{2,MAX}$ of approximately 35° C. Since the ambient temperature is generally of a similar order of magnitude, thermal energy can be discharged to the environment only with comparatively significant energy expenditure. In order to enable the discharge of thermal energy at a higher temperature level, in some cases, in place of two substantially identically constructed cooling circuits 21, 22, the second cooling circuit 22 is modified in a manner as illustrated by way of example in FIG. 4. In this instance, at least the heat exchanger 20*b* of FIG. 3 is supplemented by at least one additional heat exchanger which is integrated in the supply housing 12.

Figure 4:
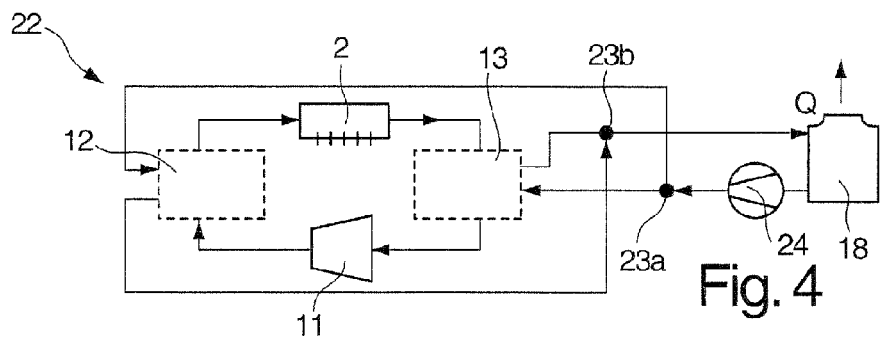
FIG. 4 is a schematic illustration of a modified cooling circuit for the gas laser of FIG. 1 and FIG. 2.

The cooling circuit 22 illustrated in FIG. 4 serves to cool both the laser gas flowing from the radial fan 11 to the resonator 2 and the laser gas flowing in the opposite direction, that is to say, from the resonator 2 to the radial fan 11. The cooling medium flows in this instance from the second cooling assembly 18 via a common cooling medium line to a first branching or distribution location 23*a* and is supplied from that location via two separate cooling medium lines to the supply housing 12 or the suction housing 13, more precisely a heat exchanger (not shown in FIG. 4) provided at that location. The cooling medium that is heated by the laser gas is combined at a second distribution location 23*b*, and from that location supplied via a common discharge to the second cooling assembly 18.

In the present example, the cooling assembly is a passive cooler in the form of an open air cooler, which discharges the thermal energy supplied to it via cooling ribs which are not illustrated in greater detail. The second cooling circuit 22 also has a pump 24 that can be controlled by the control device (not shown) in order to enable at the second cooling medium circuit 22 a cooling medium flow having a desired quantity of cooling medium per time unit (cooling medium mass flow). The heat flow Q per time unit which can typically be discharged directly to the environment via the open air cooler 18 when the gas laser 2 is operated is in the region of several Kilowatts, for example, approximately 40 kW.

Figure 5:
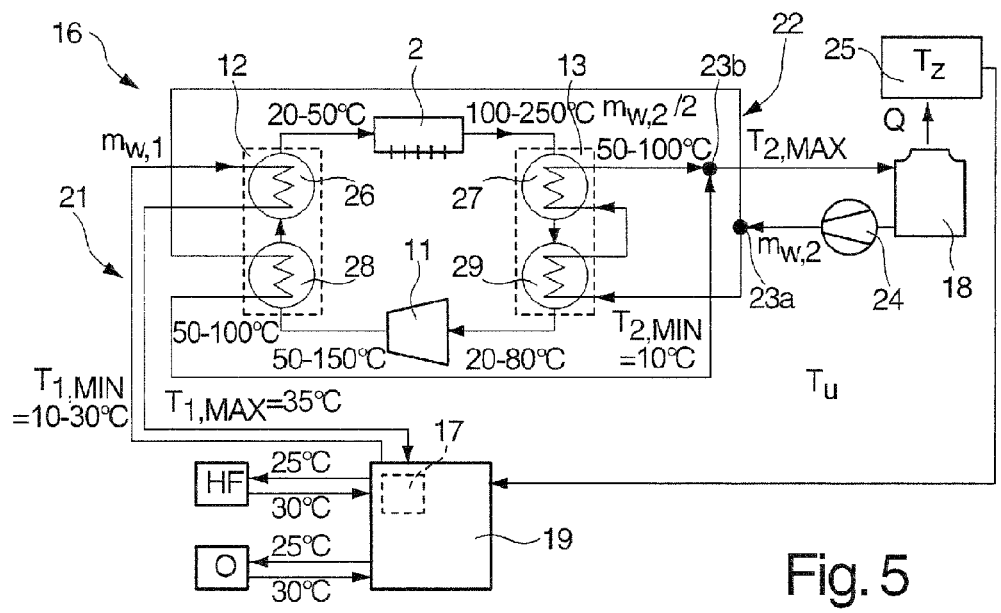
FIG. 5 is a schematic illustration of a cooling arrangement for the gas laser for two-stage cooling of the laser gas with different cooling circuits.

FIG. 5 shows a cooling arrangement 16 in which the second cooling circuit 22 of FIG. 4 is integrated or in which the second cooling circuit 22 illustrated in FIG. 3 has been replaced by the second cooling circuit 22 of FIG. 4. In the cooling arrangement 16 of FIG. 5, the laser gas flowing through the suction housing 13 is cooled exclusively by the second cooling circuit 22, for which in the present example, two heat exchangers 27, 29 connected in series are used. As can also be seen in FIG. 5, at the distribution location 23a of the cooling medium mass flow $m_{w,2}$, which originates from the second cooling assembly 24 and which may have, for example, a value of approximately 0.24 kg/s, is divided into two equally sized cooling medium mass flows $m_{w,2}/2$ (for example, with approximately 0.12 kg/s). The part-flow of the cooling medium of the second cooling medium circuit 22, which is supplied to the supply housing 12 or another heat exchanger 28 arranged at that location, is joined at the second distribution location 23b to the part-flow which passes through the two heat exchangers 27, 29 arranged in the suction housing 13, parallel therewith.

The cooling medium mass flow $m_{w,2}$ through the second cooling circuit 22 is adjusted in this instance by the pump 24 in such a manner that the minimum temperature $T_{2,MIN}$ of the cooling medium on leaving the second cooling assembly 18 in the present example is at approximately 10° C. but may also be greater and may be, for example, at 20° C., 30° C. or 40° C., it being in particular possible for $T_{1,MIN}$ to be less than $T_{2,MIN}$. The cooling medium part-flow supplied to the additional heat exchanger 28 of the supply housing 12 is heated in the same manner as the cooling medium part-flow passing through the two heat exchangers 27, 29 of the suction housing 13 to a temperature of from approximately 50° C. to approximately 100° C. Generally in this instance, the cooling medium part-flow passing through the two heat exchangers 27, 29 of the suction housing 13 is heated to a greater extent than the cooling medium part-flow supplied to the additional heat exchanger 28 of the supply housing 12. At the second distribution location 23b, the two part-flows become combined, whereby, owing to the identical cooling medium mass flows, a mixing temperature of $T_{2,MAX}$ at the second cooling assembly 18 is adjusted, which corresponds to the mean of the temperatures of the cooling medium part-flow supplied to the supply housing 12 and which flows through the suction housing 13. The temperature level at which the thermal energy can be discharged to the environment is consequently significantly greater in the cooling arrangement shown in FIG. 5 than in the arrangement shown in FIG. 3, so that even at high ambient temperatures $T_u$ of, for example, approximately 43° C., a direct discharge of heat to the ambient air is possible.

The first cooling medium circuit 21 is required to cool the laser gas to temperatures of less than approximately 40° C. before entry into the resonator 2. Since the laser gas is pre-cooled by the additional heat exchanger 28 arranged in the supply housing 12, however, the compression cooling assembly 17 of the first cooling circuit 21 (with the same cooling medium mass flow) can be sized to be smaller than is the case in the example shown in FIG. 3. It is possible to dispense completely with a compression cooling assembly for the second cooling circuit 22 in FIG. 5, so that the common housing 19 for the compression cooling assemblies can also have smaller dimensions.

Using the compression cooling assembly 17, the cooling medium mass flow $m_{w,1}$ through the first cooling circuit 21 can be adjusted, and the cooling medium mass flow $m_{w,1}$ (in the present example approximately 0.8 kg/s) is generally selected to be larger than the cooling medium mass flow $m_{w,2}$ of the second cooling circuit 22. In this manner, the cooling medium of the second cooling circuit 22 is heated, as desired, to a greater extent than the cooling medium of the first cooling circuit 21. The cooling media used in the first and second cooling circuit 21, 22 may be identical; for example, it may in both cases involve cooling water. However, it is of course optional to use different cooling media in the two cooling circuits 21, 22.

In place of direct discharge of the thermal energy to the environment, the second cooling assembly 18 may also have a heat discharge side, which is connected to an energy recovery unit 25. The energy recovery unit 25 may be constructed as in DE 10 2008 013 816 B4 and in particular may be used to provide the recovered energy for the gas laser 1 or the laser processing system. For example, the energy recovery unit may be a sorption refrigeration machine which discharges the cold produced to the compression cooling assembly 17 of the first cooling circuit 21, as indicated in FIG. 5 by an arrow. Of course, there are also other possibilities for using the energy recovery unit 25 for converting thermal energy into other energy forms. For example, it may be used to convert thermal energy into mechanical or electrical energy which can be used, for example, to operate an air compressor for the gas laser 1.

In this instance, it is found to be advantageous that, using the pump 24, the cooling medium mass flow $m_{w,2}$ of the second cooling circuit 22 and consequently the temperature level $T_{2,MAX}$ provided by the heat discharge side of the second cooling assembly 18 can be adapted to the type of an energy recovery unit used in each case so that it is located above the limit temperature $T_Z$ of the energy recovery unit 25 used in each case or corresponds to this limit temperature $T_Z$.

The heat exchangers 26 to 29, which are arranged in the supply housings 12 or in the suction housings 13, can be constructed in different manners. For example, the heat exchangers 26, 27 or 28, 29 may be ribbed pipes which are integrated in a common cooling cartridge. This is advantageous since in such a system individual cooling circuits can be separated in a particularly simple manner. However, plate type heat exchangers, finned coolers, coil coolers, for example, of aluminum, waste gas heat exchangers, etc., can also be used in the present application as heat exchangers 26 to 29.

Of course, in contrast to what is illustrated in the examples above, in order to cool the laser gas, it is also possible to use more or fewer heat exchangers (connected in series). For example, in a respective suction housing 13, in place of two heat exchangers 27, 29, only a single heat exchanger can be arranged. The use of the same number of heat exchangers in the supply housings 12 and the suction housings 13 (in the present example, two in each case) has been found to be advantageous since this simplifies the construction of the gas laser 1.

A number of embodiments of the invention have been described. Nevertheless, it will be understood that various modifications may be made without departing from the spirit and scope of the invention. Accordingly, other embodiments are within the scope of the following claims.

What is claimed is:

1. A laser gas cooling system comprising:
   a first cooling circuit circulating a first coolant flow through a first cooling assembly and a first heat exchanger at which heat is extracted from laser gas flowing from a fan to a gas laser resonator; and
   a second cooling circuit circulating a second coolant flow, independent of the first coolant flow, through a second cooling assembly and a second heat exchanger at which heat is extracted from laser gas flowing from the resonator to the fan;

wherein the second cooling circuit has at least one additional heat exchanger configured to additionally cool the laser gas flowing from the fan to the resonator, and wherein the first cooling circuit is configured to cool only the laser gas flowing from the fan to the resonator.

2. The laser gas cooling system of claim 1, wherein during operation a minimum cooling medium temperature of the first cooling circuit is lower than a minimum cooling medium temperature of the second cooling circuit.

3. The laser gas cooling system of claim 1, wherein the second cooling circuit is constructed to direct the second coolant flow through the second heat exchanger and the additional heat exchanger in a parallel manner.

4. The laser gas cooling system of claim 1, wherein during operation a cooling medium mass flow through the additional heat exchanger is smaller than a cooling medium mass flow through the first heat exchanger.

5. The laser gas cooling system of claim 1, further comprising a flow adjuster configured to adjust a cooling medium mass flow through the second cooling circuit.

6. The laser gas cooling system of claim 1, wherein the first cooling assembly is a compression cooling assembly.

7. The laser gas cooling system of claim 1, wherein the second cooling assembly is an open air cooler.

8. The laser gas cooling system of claim 1, wherein at least one of the first, second and additional heat exchangers is selected from the group consisting of: plate type heat exchangers, finned coolers, coil coolers and waste gas heat exchangers.

9. A gas laser comprising:
a resonator;
a fan configured to produce a flow of a laser gas for the resonator; and
the laser gas cooling system of claim 1, arranged to cool the flow of laser gas.

10. The gas laser of claim 9, further comprising an energy recovery unit configured to recover thermal energy provided during operation of the gas laser at the second cooling assembly.

11. A method of cooling laser gas of a gas laser, the method comprising:
cooling laser gas flowing from a fan to a resonator of a gas laser, using at least a first heat exchanger of a first cooling circuit;
cooling laser gas flowing from the resonator to the fan, using at least a second heat exchanger of a second cooling circuit independent of the first cooling circuit; and
additionally cooling the laser gas flowing from the fan to the resonator by flowing the laser gas through an additional heat exchanger of the second cooling circuit;
wherein during operation a minimum cooling medium temperature of the first cooling circuit is lower than a minimum cooling medium temperature of the second cooling circuit.

12. A laser gas cooling system comprising:
a first cooling circuit circulating a first coolant flow through a first cooling assembly and a first heat exchanger at which heat is extracted from laser gas flowing from a fan to a gas laser resonator; and
a second cooling circuit circulating a second coolant flow, independent of the first coolant flow, through a second cooling assembly and a second heat exchanger at which heat is extracted from laser gas flowing from the resonator to the fan;
wherein the second cooling circuit has at least one additional heat exchanger configured to additionally cool the laser gas flowing from the fan to the resonator; and
wherein during operation a minimum cooling medium temperature of the first cooling circuit is lower than a minimum cooling medium temperature of the second cooling circuit.

\* \* \* \* \*